Patented Oct. 24, 1922.

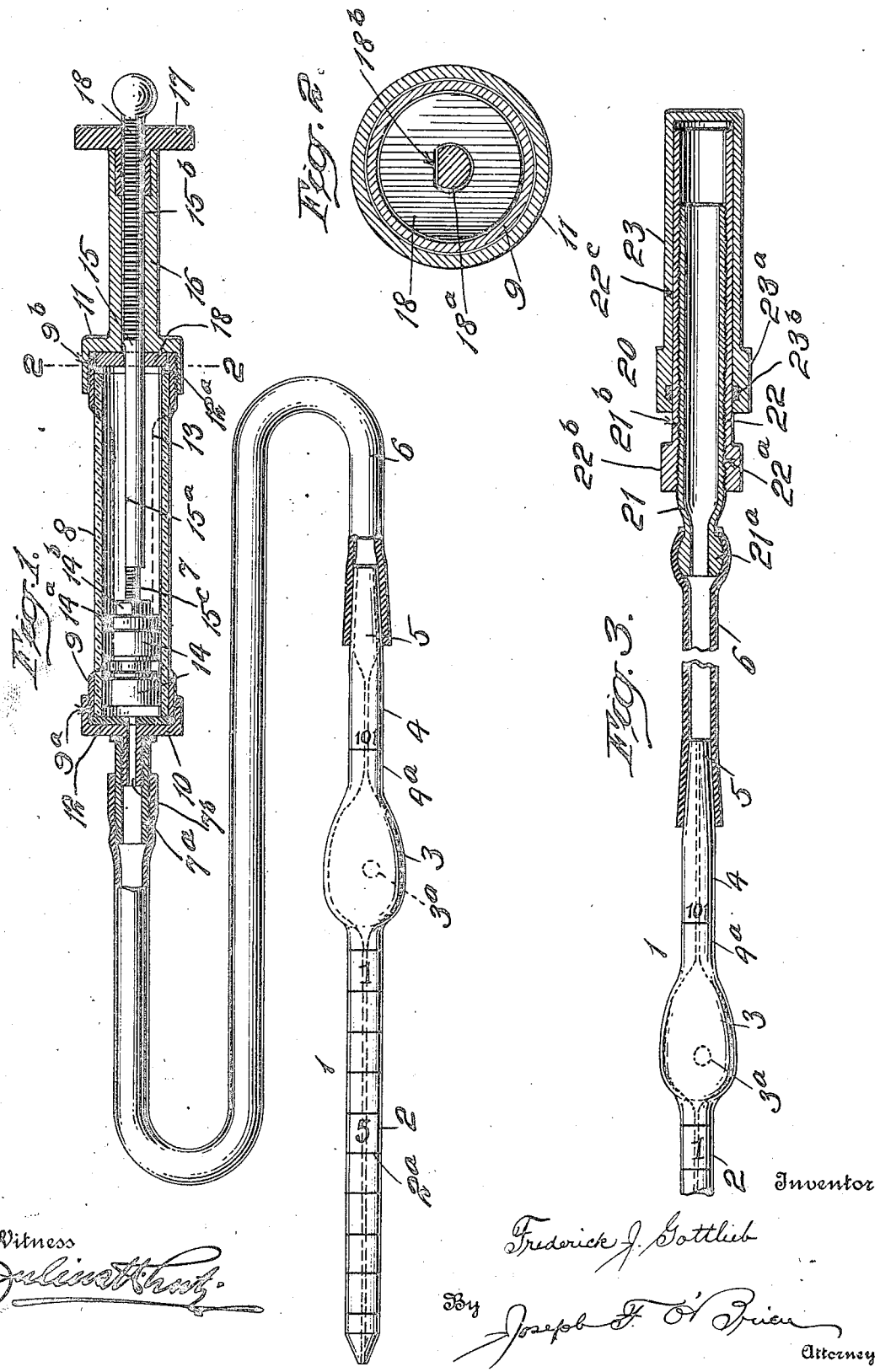

1,433,075

UNITED STATES PATENT OFFICE.

FREDERICK J. GOTTLIEB, OF NEW YORK, N. Y.

LIQUID-MEASURING APPARATUS.

Application filed December 2, 1918. Serial No. 264,943.

*To all whom it may concern:*

Be it known that I, FREDERICK J. GOTTLIEB, a citizen of the United States, and resident of New York city, in the county of New York and State of New York, have invented certain new and useful Improvements in Liquid-Measuring Apparatus, of which the following is a specification.

This invention relates to improvements in liquid measuring apparatus.

The primary object of this invention is to provide means for controlling, regulating or limiting with great precision the degree of suction or vacuum in a suitable measuring channel, chamber or the like to enable the precise measurement within such channel, chamber; or the like of any predetermined volume of liquid which is caused to move in a column within said channel by such suction or vacuum. My said invention is particularly adapted for measuring extremely small quantities of liquid, such as blood, which it is necessary subsequently to dilute before the corpuscles, cells or the like contained therein may be counted, thus causing any minute error in volume to be enormously multiplied and consequently requiring the utmost accuracy.

More particularly, my invention embodies a capillary pipette having graduations suitable for the character of the liquid or liquids it is desired to measure therein, in combination with a suction or vacuum-producing element, such as a suction pump or syringe, the degree of vacuum-producing movement of which is accurately controlled by a manually-actuated screw, preferably a very fine micromoter screw. This controlled movement of the vacuum producing element in turn accurately controls the visible movement within the pipette of a column of blood or other liquid which it is desired to measure and enables the movement within such pipette of such column of liquid to be accurately and positively stopped within hair-line limits.

Another feature of my invention comprises the provision in combination with a suitably graduated pipette of a vacuum-producing element which is jointly controlled by the manual rotation of a screw device and a manually-actuated pull or sliding device, whereby rapid movement of the liquid column may be caused to an approximate limit by the direct manipulation or pull of the piston handle and a more accurate movement and stopping of such column, may, by manipulation of the screw device, be procured.

Other objects and features of my invention will be apparent from an examination of the illustrations depicted in the accompanying drawings in conjunction with the analysis of said invention embodied in the following specification.

In said drawings in which similar reference characters designate corresponding parts throughout the several views, Fig. 1, is a plan view, partly in section, of a device embodying my invention.

Fig. 2 is a section on a line 2—2 of Fig. 1 and

Fig. 3, is a fragmentary view partly in plan, and partly in section, of another device embodying a modified form of my invention.

Figs. 1 and 2 of these drawing illustrate on an enlarged scale a form of my invention particularly adapted for measuring an exact quantity of human blood and mixing therewith an exact quantity of a diluting liquid, the diluted blood thus obtained to be subsequently used in a hæmocytometer to determine the number of erythrocytes in the blood. In said figures 1 indicates a pipette which embodies a front capillary tube 2, provided with suitable graduations $2^a$; a rear capillary tube 4 provided with a graduation $4^a$; a mixing chamber 3 located intermediate and communicating with the two tubes 2 and 4 and provided with a mixing bead $3^a$ and an outlet nipple 5 which communicates at one end with the tube 4. The nipple 5 has a readily disconnectable connection by means of a flexible tube or hose 6 with a vacuum-producing element 7 having, as shown, nipples $7^a$, $7^b$, to permit an air tight connection therewith. As illustrated in Figs. 1 and 2, said vacuum-producing element 7 comprises a conventional pump or syringe barrel, having a cylinder 8 of glass partially encased by a metallic casing 9 provided at its opposite ends with screw threads $9^a$, $9^b$ and screw caps 10 and 11 between which and the cylinder 8 suitable rubber discs 12, $12^a$ are provided to produce air tight joints for a vacuum or pump chamber 13. Within this chamber 13, as shown, is reciprocated a double piston-head 14, manipulated by means of a sliding piston rod 15 which extends through an opening in the cap 11 and through a bearing 16 formed, as illustrated, integrally with the cap 11. Said piston is preferably keyed against turning by suitable means such as a disc 18 fixed by the screw cap 11 which disc is provided with a bore 18ª having a flat wall 18ᵇ which abuts against a flat face 15ª of the piston rod 15. The movement of the piston 14 is controlled by the rotation of an interiorly screw-threaded mill head 17 on an exterior screw thread 15ᵇ on the rod 15 when said mill head bears against the bearing 16 and is also movable by a direct pull outwardly on the rod 15, the mill head being employed as a finger hold, if desired. This arrangement enables a fine adjustment of suction for measurement of a blood column and a more rapid movement of the piston for the sucking in of the diluting liquid, the movement or movements of the liquid column being, of course, in proportion to the degree of suction and being visible in the graduated glass pipette. The diameter of the pistons 14 may, in the embodiment shown, be expanded or reduced in size in the usual way by the movement of an expansion collar 14ª and nut 14ᵇ on the screw thread 15ᶜ on a reduced portion of the rod 15, the said reduced portion releasing the rod from the keying action of the disc 18 and permitting the rotation of the rod 15 through the opening therein to allow a binding of the nut 14ᵇ and an adjustment of the same on the screw thread 15ᶜ.

In the embodiment of my invention shown in Fig. 3, a portion of a pipette 2 is illustrated. In this figure 3 indicates the mixing chamber, 3ª the mixing bead, 4 the rear capillary tube, 4ª the graduations on said rear tube and 5 the nipple which is connected by rubber tube 6 to a vacuum-producing element 20 comprising a cylindrical, barrel-member 21 provided with a nipple 21ª and an exterior screw-thread 21ᵇ. Mounted upon the member 21 is an intermediate cylindrical member 22, provided with an interior screw thread 22ª co-acting with the thread 21ᵇ; a manually-manipulated mill head or nut 22ᵇ and a smooth exterior surface 22ᶜ on which is fitted a sliding cap 23 having an air-tight connection by gasket 23ᵇ with the member 22 and also provided with a finger piece 23ª.

Obviously when the mill head 22ᵇ is rotated about the barrel-member 21, a fine adjustment of the suction may be procured and when rapid suction is desired the cap may be slid outwardly on the member 22 by grasping the finger piece 23ª. The degree of suction will as above described in respect to Figs. 1 and 2, be indicated by the movement of the liquid in the capillary tubes of the pipette 2.

The operation of the device will be obvious from the foregoing description.

It will be understood that it is essential in physiological researches, such as counting the corpuscles in the blood, to get the precise amount of liquid to a hair line limit the first time; to procure this relatively small and exact amount of liquid rapidly so as to avoid coagulation and then without an instant's delay to procure a dilution of the relatively small blood column. It will likewise be understood that if the suction causes the blood liquid to move the slightest hair breadth beyond the measuring graduation, it will be necessary to go through the entire operation over again, in which case, in blood counting, the patient must be punctured a second time to procure a fresh drop of blood and the instruments employed must be thoroughly cleansed, sterilized and dried by the use of alcohol, ether and air, all of which causes a great loss of time and much annoyance to the practitioner; and it is this difficulty heretofore frequently encountered that my invention is intended to obviate.

Having described my invention, I claim:

1. Liquid measuring apparatus embodying, in combination, a pipette having a capillary tube provided with suitable graduations and a vacuum-producing element connected thereto and provided with manually-actuated and positively controlled means for adjusting the amount of suction produced by said element.

2. Liquid measuring apparatus embodying in combination, a pipette, having suitable graduations and a vacuum-producing element connected thereto and provided with manually - actuated screw - controlled means for adjusting the precise amount of suction produced by said element.

3. Liquid measuring apparatus, embodying, in combination, a pipette having suitable graduations and a vacuum - producing element connected thereto and jointly controlled by a manually-actuated screw-device for adjusting a precise amount of suction, and a manually-actuated pull-device for procuring more rapid suction.

4. Liquid measuring apparatus embodying, in combination, a pipette having suitable graduations and a vacuum-producing element connected thereto and comprising a pump barrel, a piston movable within said barrel, a piston-rod for actuating said piston, a disc for keying said piston-rod against rotation and screw means acting upon said piston rod to move the same within said barrel.

5. Liquid measuring apparatus embodying in combination, a pipette having suitable graduations and a vacuum-producing element connected thereto and comprising a pump barrel, a piston movable within said barrel, a piston-rod for actuating said piston, a disc for keying said piston-rod against rotation, and screw and nut means for expanding and contracting said piston located on a reduced portion of said piston rod, whereby a binding of the nut may be permitted to adjust the expansion and contraction of the piston without disassembly of parts.

Signed at the borough of Manhattan, city of N. Y., in the county of New York and State of New York, this 29th day of November, A. D. 1918.

FREDERICK J. GOTTLIEB.